Nov. 7, 1961 D. S. JOHNSON ET AL 3,007,296
APPARATUS FOR HANDLING, SEPARATING AND
POSITIONING STACKED ARTICLES
Filed Oct. 24, 1960 4 Sheets-Sheet 1
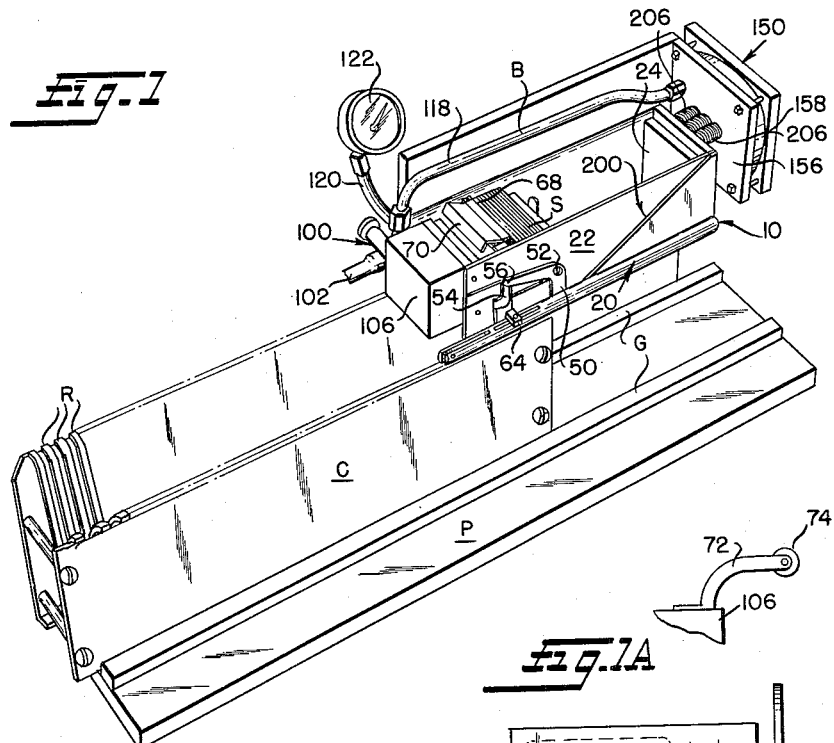
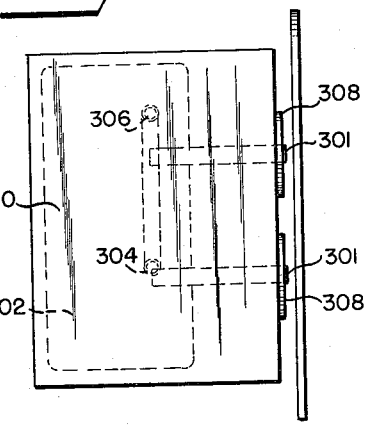
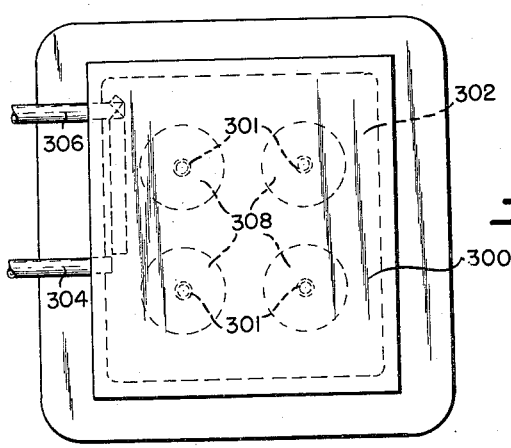
INVENTORS
Donald S. Johnson
Robert H. Murray
BY *Shlesinger & Shlesinger*
ATTORNEYS INVENTORS
Donald S. Johnson
Robert H. Murray

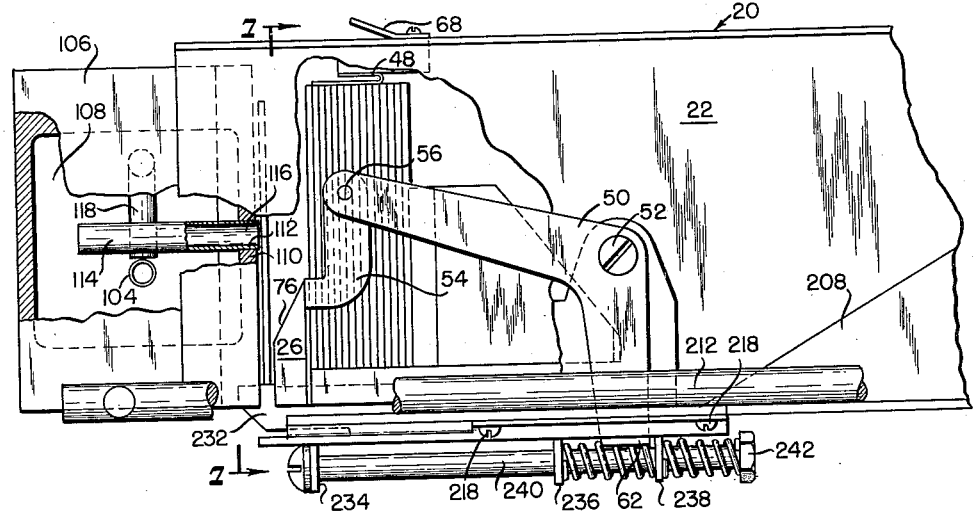
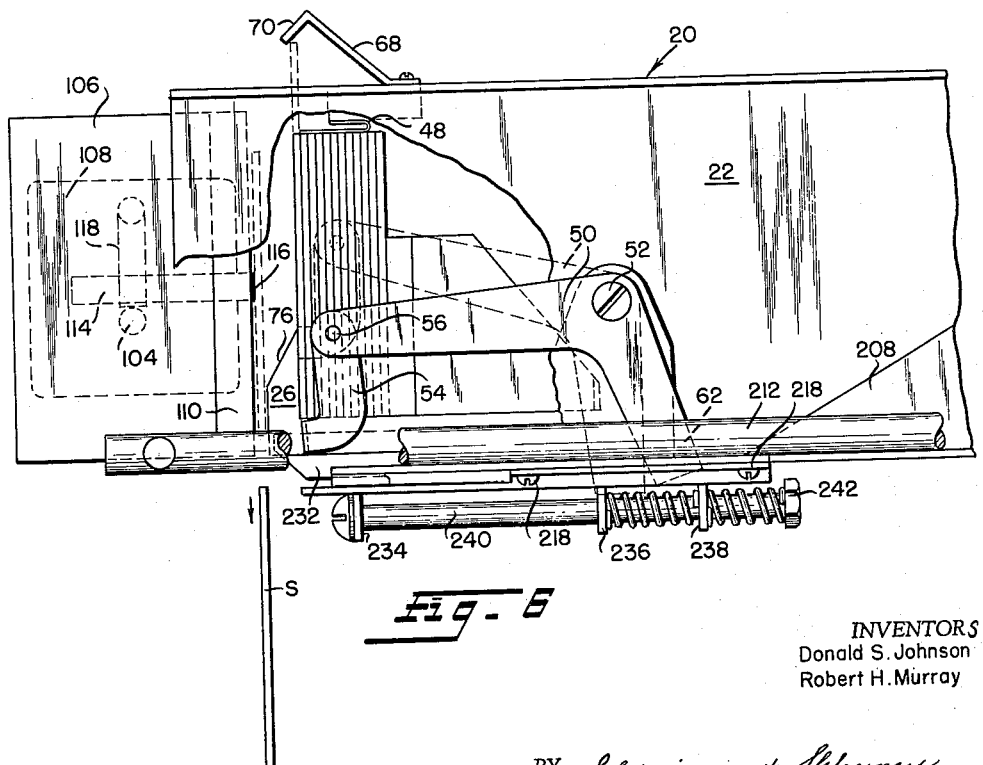

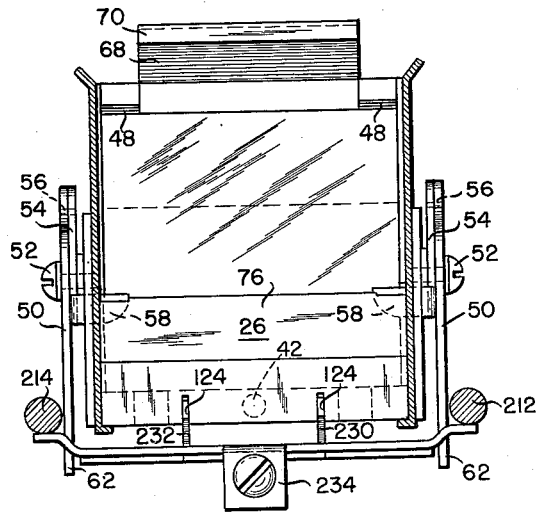
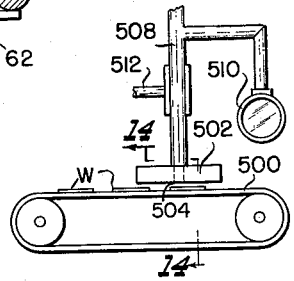
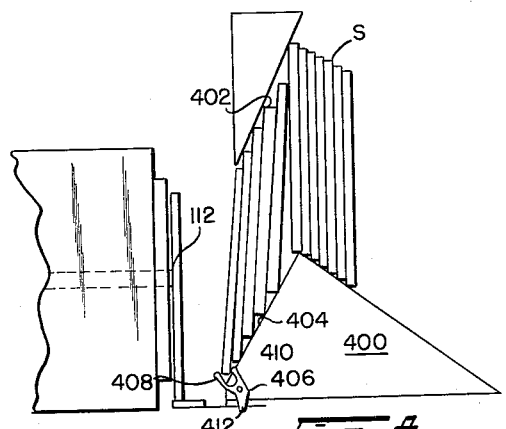
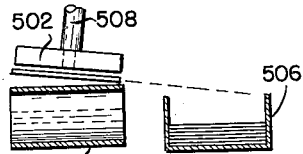
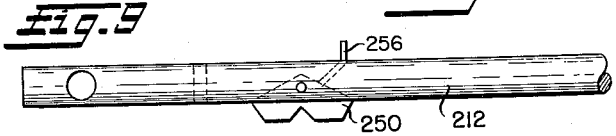
INVENTORS
Donald S. Johnson
Robert H. Murray

United States Patent Office 3,007,296
Patented Nov. 7, 1961

3,007,296
APPARATUS FOR HANDLING, SEPARATING AND POSITIONING STACKED ARTICLES
Donald S. Johnson, Falls Church, and Robert H. Murray, 1101 Lee Highway, Arlington 9, Va.; said Johnson assignor to said Murray
Filed Oct. 24, 1960, Ser. No. 64,616
24 Claims. (Cl. 53—246)

This invention relates to improvements in the handling, separating and positioning of articles and particularly articles of the plate type. The basic principles of the invention may be used to handle all types and sizes of articles so long as a portion of the article has a surface which is smooth and unbroken.

In the past, considerable difficulty has been experienced in the handling of plate or wafer type articles particularly if there is some type of lubricant or the like between the articles. Most of the articles of this type have to be removed by hand from the stack and positioned individually within a container for packaging, cleaning, or the like. In the handling of glass slides in the photographic industry for positioning within a container to be used in the cleaning of the glass slides, manual means has been primarily used. This is a very time consuming job particularly when thousands of glass slides must be cleaned daily. Automatic type equipment which can handle large numbers of glass slides is highly desirable. It is an object of this invention to provide automatic equipment which will perform the functions of handling and positioning glass slides or other articles in a container quickly and without the need for manual control.

It is a further object of this invention to provide a device which will be able to sense the presence of articles having a smooth and continuous surface.

Yet another object of this invention is to provide a machine which can be operated by pneumatic pressure.

Yet another object of this invention is to provide a machine which will automatically shut itself off upon delivery of the last article.

Still another object of this invention is to provide a system which will be inexpensive and simple to manufacture.

Yet a further object of this invention is to provide a machine which will automatically separate articles which are difficult to separate one from the other because of friction. This is particularly advantageous where the articles adhere to one another because of a coated surface on the article.

It is still a further object of this invention to provide a machine which will index the container in which the articles are to be placed without manual assistance.

Another object of this invention is to provide a device which will sense and object and simultaneously perform another operation in conjunction with the sensing of the article.

A still further object of this invention is to provide a machine which will operate on articles which are perforated.

A further object of this invention is to provide a machine which is portable and compact.

These and other objects and advantages of this invention will be apparent from the following description and claims.

In the accompanying drawings which illustrate by way of example various embodiments of this invention:

FIGURE 1 is a perspective showing one embodiment of the invention.

FIGURE 1a is a fragmentary enlargement showing a modification of a slide separator.

FIGURE 5 is an enlarged fragmentary side elevation view of a portion of the embodiment shown in FIGURE 1 with portions broken away and with the plate positioned ready for release.

FIGURE 6 is a view similar to FIGURE 5 and with the plate in release position as shown by the full lines and with the plate in position ready for release as shown in the broken lines.

FIGURE 7 is a cross sectional view of the embodiment shown in FIGURE 5 and taken along the line 7—7 of FIGURE 5 looking in the direction of the arrows.

FIGURE 8 is a fragmentary side elevational view showing another embodiment of the invention.

FIGURE 9 is an enlarged fragmentary side elevational view of a portion of the reciprocating pawl mechanism.

FIGURE 10 is top plan view of the structure shown in FIGURE 9..

FIGURE 11 is a side elevation of a further embodiment showing a plurality of orifices operating on a single plate.

FIGURE 12 is a front elevation view of the embodiment of FIGURE 11.

FIGURE 13 is a diagrammatic view showing another embodiment of this invention.

FIGURE 14 is a sectional view of FIGURE 13 taken along the line 14 of FIGURE 13 looking in the direction of the arrows.

The embodiment shown in FIGURE 1 comprises a base platform P. Guide ways G are provided for the container C. Container C is provided on the inside along the full length thereof with ribs R. The glass slides S are positioned in the grooves between the ribs R. The container C after it has been filled with the slides S is removed from the platform P and placed in a washing device (not shown) for the purposes of cleaning the slides S.

A bracket B supports the article handling device 10. The article handling device 10 consists primarily of an article carrier 20, a cylinder and piston assembly 150 and a reciprocating carriage assembly 200.

Figure 2:
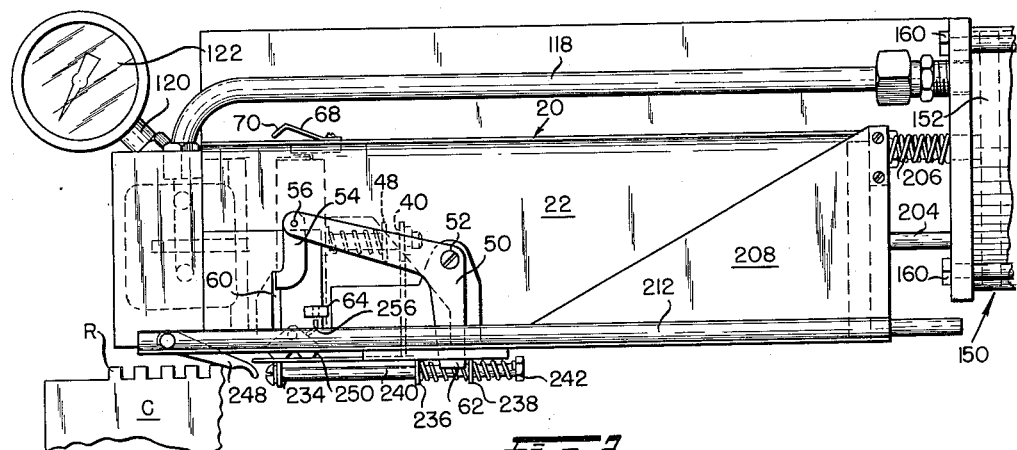
FIGURE 2 is an enlarged fragmentary side elevation showing a portion of the embodiment shown in FIGURE 1.

The article carrier 20 as best shown in FIGURE 2 comprises side walls 22 connected to a rear wall 24 and to the fluid pressure system 100. A wedge-shaped retainer 26 extends between the side walls 22. Glass plate supporting rods 28 are secured at one end to the wall 24 and at the other end to the retainer 26. An article supporting follower 30 is provided with legs 32 having portions 34 which rest on the rods 28. A pin 36 projects rearwardly from the follower 30. A spring 38 urges a locking lever 40 into pressure engagement with a follower locking rod 42 in a manner similar to the follower commonly found in card file drawers. Adjustment of the tension on the spring 38 is controlled by the threaded nut 44 on the pin 36. A lug 46 on member 40 engages a washer 48 to aid the clutching action of member 40 on rod 42. Rod 42 is in the same plane as rods 212 and 214. A spring pressure plate 48 maintains a constant pressure on the slides S. The pressure plate 48 is secured to one of the side walls 22.

A bell crank 50 pivoted at 52 is secured to each of the side walls 22. At one end of the bell crank 50 a lifting lever 54 is pivoted as at 56. A lifting lever 58 as best shown in FIGURES 5 and 7 projects through a slot 60 as best shown in FIGURE 2 for engagement with the bottom of the slide S. The bell crank 50 has a lower arm 62 which projects downwardly beneath the rods 22 and 42 for reasons hereinafter described. A bracket member 64 is secured to the side wall 22. The bracket 64 has a central opening 66 for purposes hereinafter described. A spring member 68 is secured between side walls 22. A downwardly projecting flange 70 shown in FIGURES 2 and 3 and FIGURE 6 permits tilting of the slides S when they are raised over the wedge retainer 26. A slightly different modification of this structure is shown in FIGURE 1a comprising a spring member 72 carrying a roller 74. The inside wall 22 of the article carirer 20 may be secured to the member B by means of bolts or the like (not shown).

Retainer 26 is beveled as at 76 to permit the slides S to move forward in front of the retainer 26 when they are raised by the fingers 58.

Figure 3:
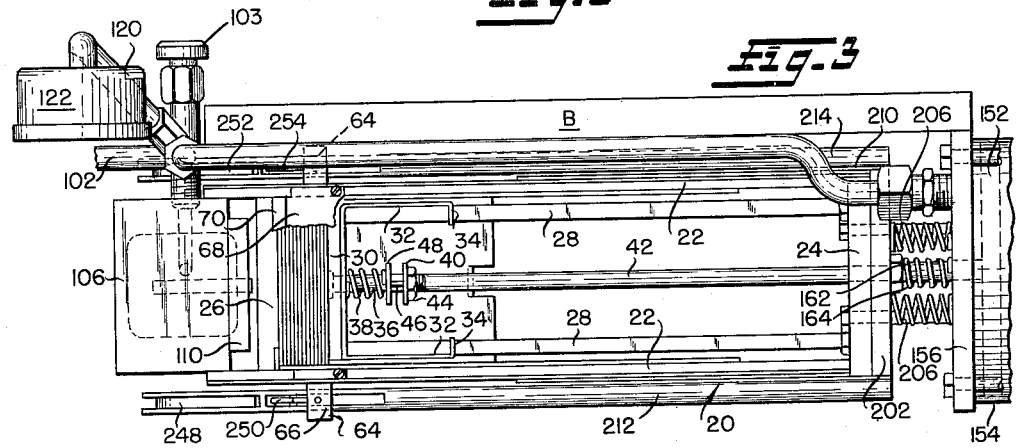
FIGURE 3 is an enlarged fragmentary top plan view showing the embodiment of FIGURE 1.

A fluid pressure system 100 comprises a fluid pressure line 102 which is connected to a source of fluid pressure (not shown). The fluid pressure line includes a feed-in pipe 104. Pipe 104 feeds into a block 106 having a chamber 108. The end of the feed-in 104 extends into the chamber 108 A plate 110 as best shown in FIGURE 3 seals off the chamber 108. A bore 112 is centrally located of the plate 110. The bore 112 supports tubular member 114 as best shown in FIGURE 5. The tubular member 114 projects slightly beyond the outside face of the plate 110. The distance of projection is exaggerated in the drawings. The projection should not be greater than .003 of an inch. The minimum width of the plate 110 should be approximately at least 5 times the diameter of the orifice 116 of the tubular member 114. The length of the tubular member 114 should not be less than 3 times the diameter of the orifice 116. The reasons for the dimensional sizes will be discussed hereafter. Block 106 which includes the plate 110 may be constructed of any suitable materials such as metal, plastic, or the like. The chamber 108 is shown in the drawings to be rectangular. The chamber may be of other configurations though the corners in the chamber help to promote even pressures throughout the systems. The block 106 is generally secured to walls 22 of the article carrier 20 by means of screws or adhesive or the like.

Figure 4:
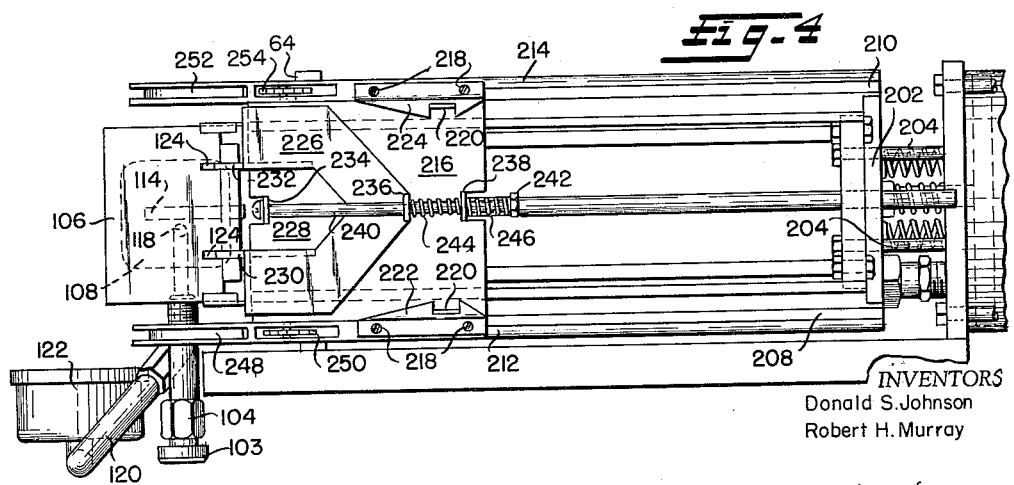
FIGURE 4 is an enlarged fragmentary bottom plan view showing the embodiment of FIGURE 1.

A back feed pressure line 118 as best shown in FIGURE 5 and FIGURE 1 projects into chamber 108. It is desirable that the end of the back feed pressure line within the chamber be located in aspirating position of the fluid pressure supply line 104. This particular arrangement may best be seen in the modification of the chamber of FIGURE 12. The purpose for the arrangement will be hereinafter described. A branch line 120 from the back pressure line 118 connects to a gauge 122 which senses the change in pressure in the back pressure line 118. Slots 124 as best shown in FIGURE 4 are provided in the bottom of the block 106.

Back pressure line 118 connects to a cylinder and piston assembly 150. Any similar piston and cylinder arrangement may be utilized. In the drawings, a piston 152 is contained in a cylinder 154. The cylinder is closed by means of plates 156 and 158. Fastening means for securing the plates 156 and 158 in relation to the cylinder 154 are provided as at 160. The piston 152 mounts thereon a piston rod 162 which extends through plate 156. A spring 164 is carried by the piston rod 162 exteriorly of the piston and cylinder assembly 150. Piston and cylinder assembly 150 is secured to the bracket B by any suitable means not shown. Piston 162 is secured to the reciprocating carriage assembly 200 at the back plate 202. Support rods 204 as best shown in FIGURES 4 and 2 serve to connect the cylinder and piston assembly 150 with the article carrier 20 and to stabilize the reciprocating carriage assembly 200. The rods 204 pass through the back plate 202 and through the plate 24 and are secured by suitable means such as nuts or the like. Booster springs 206 assist in maintaining the alignment of the reciprocating carriage assembly 200. The booster springs are located between plate 164 and plate 202 as best shown in FIGURE 3.

Side plates 208 and 210 are supported on back plate 202. Rods 212 and 214 supported by side plates 208 and 210 carry a slide release plate 216 best shown in FIGURE 4. The slide release plate 216 is secured to the rods 212 and 214 by bolts 218 or the like.

Plate 216 is slotted as at 220 to receive the portion 62 of bell crank 50 for purposes hereinafter described. FIGURE 4 shows clamping plates 222 and 224 which are also slotted and receive the lower portion of bell crank 50. Members 222 and 224 may be integrally constructed with the release plate 216.

The plate 216 carries a yoke member 226 which in turn carries a plate member 228 having projecting fingers 230 and 232 which are received in the slots 124 in the bottom of the block 106 as best illustrated in FIGURE 4. The plate 228 may be formed integrally with the yoke 226. Projecting downwardly from the plate 216 are ears 234, 236 and 238. These are best shown in FIGURES 2 and 4. The ears 234, 236 and 238 support a rod 240. A nut 242 is provided at one end of the rod 240. Between the ears 236 and 238 is mounted a spring 244. Between the ear 238 and the nut 242 an additional spring 246 is mounted. The purpose of these springs will be described hereafter. The rods 212 and 214 carry pawls 248 and 250 and pawls 252 and 254, respectively. Pawls 248 and 252 engage the ribs R of the container C to index it for receipt of the slides S. When the last rib has passed pawls 248 and 252 and pawls 250 and 254 which are shaped somewhat like an inverted V, pivot about their pivot pin a counterclockwise direction and a pin 256 best shown in FIGURE 2 moves up and into the opening 66 of the bracket-like member 64; pawls 250 and 254 are counter balanced by springs, weights, for other means not shown in the drawings. This prevents further operation of the device. The pawls 248, 250, 252, and 254 may be mounted in any satisfactory manner upon the rods 212 and 214. FIGURES 9 and 10 in detail show the manner of mounting pawl 250 on rod 212.

*Alternative construction of the block*

FIGURES 11 and 12 show an alternative construction of a block 300 which has a plurality of orifices 301. A single chamber 302, a single fluid pressure line 304 and a back pressure line 306 are sufficient for the operation of more than one orifice 301. The plurality arrangement shown in FIGURES 11 and 12 is for utilization were the plate to be picked up has a central opening therein. It is obvious that many arrangements can be worked out of the orifices 301 in order to accommodate various designs and dimensions of the article to be picked up. It is also obvious that the construction of the block may be varied to some extent and that the pads 308 may be other than planar. It is important however that the effective area of the pads 308 be based on the relationship that the minimum width of the pad be at least five times the diameter of the orifice.

*Slide separator modification*

FIG. 8 discloses an arrangement which will permit separations of the slides more rapidly one from the other. This is particularly of value where the slides may be coated with some type of lubricant which makes them very difficult to separate. In this particular modification the slides S traverse an inclined surface 400. As they reach the peak of the inclined surface 400 they are affected by a second inclined surface 402 which operates on the forward top edge of the slides S causing it to pivot forwardly and thus to slide downwardly on the inclined surface 404. A pivoted stop and kicker member 406 controls the feeding of the slides S. A finger 408 prevents the slides from moving forwardly. Finger 410 acts as a kicker for the slide permitting it to feed in front of the orifice 112. Finger 412 is operated by an article feeder mechanism similar to that shown in the other drawings and obvious to one skilled in the art.

*Sensing and handling mechanism*

FIGURES 13 and 14 disclose a schematic diagram of a sheet handling device. The sheets W are fed along a conveyor 500. A plate 502 with an orifice 504 are located directly above the conveyor 500 and inclined slightly at an angle. As the plates W move along the conveyor, they are picked up and held in close proximity to the orifice 504 of the plate 502. Since there is nothing to control their movement, a slight tilt to the plate 502 as illustrated in FIGURE 14 will allow the sheets to be flipped sideways into a receptacle 506. The fluid pressure line 508 is provided with a sensing gauge 510 which indicates when articles are in position. A supporting arm 512 is connected to a support (not shown). Fluid pressure feedline 508 is connected to a source of pressure (not shown).

*Operation*

The principle of operation of the devices shown in the drawings is primarily based on the fact that a flow of air between two similar surfaces tends to draw the surfaces together. Where the flow of air is directed initially from an orifice normal to a surface before the orifice, the flow tends to divert in all directions and if the face plate in which the orifice is located is close enough to the opposing surface of the plate against which the fluid blast is directed, the flow of fluid will extend laterally between the two surfaces and will have a high velocity stream of fluid in its center flow and a lower velocity stream of fluid in its outer flow tending to create a differential pressure area between the two surfaces causing them to be attracted towards each other. It is obvious that the surfaces will never contact because they are separated by a layer of air escaping from the orifice. When the plates are attracted, the orifice is restricted and a back pressure tends to build up in the feed line. In other words, there is a reduced flow at the orifice due to the atmospheric pressure on the outer surface of the plate urging the plate against the face plate containing the orifice. In order that there be sufficient drawing effect, the area of the opposed surfaces must be sufficient to provide the necessary differential pressures to hold the plate close to the orifice while simultaneously causing a restriction of the flow of air from the orifice. It has been found that for best results, the face plate having the orifice should be at its minimum width, at least five times the diameter of the orifice. It is also important that the length of the bore be at least three times the diameter of the orifice as herefore mentioned.

Air under pressure is brought into the block 106 through the pressure feed line 102 and 104. The air enters the chamber 108 and exits through the tube 114 and the orifice 116. If there is no slide S before the orifice 116, the air flows freely through the system. When a slide S is dropped in front of the orifice 116, it is drawn towards the orifice in the manner previously described. Due to the pressure differential, the orifice is restricted by the slide S and a back pressure builds up in the chamber 108. The back pressure flows through line 118 forcing piston 152 to retract piston rod 162 retracting the entire reciprocating carriage assembly 200. Upon retraction of the reciprocating carriage assembly 200 the container C is indexed into position by the pawls 248 and 252. Simultaneously therewith, the release fingers 230 and 232 pull back from the slots 124. The slide S which is supported on the release fingers 230 and 232 is dropped into the proper spacing between the ribs R of the container C. At the same time as the indexing of the container, bell crank arm 50 is moved to the solid line position shown in FIGURE 6 from the dotted line position shown in FIGURE 6 and shown in solid line in FIGURE 5. This permits the fingers 58 to engage a new slide S as shown in FIGURE 6. Once the supporting fingers 230 and 232 are retracted to allow slide S to drop as shown in FIGURE 6, the back pressure is released and the air again flows freely out through the orifice 112. Since the back pressure tube 118 is placed in aspirating relation to the inlet of the pressure feed line 104, an aspirating effect is created on the back pressure feed line 118 thereby returning the piston 152 to its first position in the cylinder 154. To assist in this return, spring members 164 and 204 are provided.

If for some reason, a slide S should not feed properly into the container C damage will be prevented upon the slide in the feed position by the fingers 230 and 232 since they are carried by yoke 226 which is separately mounted on the plate 216 for reciprocation on the rod 240. In case of a malfunction, the reciprocating carriage assembly 200 comes fully forward into normal position but the yoke 226 carrying the fingers 230 and 232 engage the improperly positioned slide S and the yoke 226 is moved rearwardly on the rod 240 against the spring 244. This permits the fingers to remain disengaged from the slots 124 until the malfunction can be corrected without damage to the carriage 200 or to the slide S. Upon return of the piston 152 to its original position, member 54 connected to the bell crank 50 and fingers 58 engage a new slide S. Bell crank is then pivoted clockwise into the position shown in FIGURE 5 and into the dotted line position shown in FIGURE 6 due to the engagement of the end 62 of the bell crank 50 with the slot 220 of the plate 216. This lifts the slide S in engagement with the fingers 58 upwardly to a position above the top edge of the retainer wedge 26. The top of the slide S engages a flange 70 of the member 68 and causes the bottom of the slide S to move forwardly and thence to fall freely down the inclined surface 76 of the wedge 26 and into position before the orifice 112. The supporting fingers 230 and 232 again retain the slide S in position as the back pressure builds up in the chamber 108. The reciprocation of the carriage assembly 200 constantly maintains a pressure on the follower 30 due to the engagement of the member 40 with the slide plate 116 upon reciprocating movement. This urges the slides S forwardly maintaining them in position for pick up by the fingers 58. The operation is continuous until all of the slides have been fed or until such time as the container is full at which time no further reciprocation of the carriage will result because the pawl 250 will have rocked in a counterclockwise fashion as heretofore described to cause pin 256 to engage in the hole 66 of the bracket member 64. It is obvious that instead of a stop device as just described, a switch can be provided which would automatically shut off the supply of air to the chamber 108.

It will be now obvious that the pressure system 100 can be utilized to sense, to sort, to pick up, or to classify and that the back pressure line can be used to operate mechanism other than pistons such as switches, machines, motors, and so on. It is additionally obvious that the surface of the face plate 110 need not be planar but may be configured in a curvilinear fashion so long as the surface corresponds to the surface of the article at the point at which it is to be affected by the air flow and that this surface be smooth and unbroken. Any interference with the flow of air will reduce the pull effect. This has been taken into consideration as will be noted particularly in FIGURE 3 where the face plate 110 is shown not being as wide as the block 106. The reason being that the air projecting outwardly between the surface of the slide S and the face plate 110 would be affected by the side walls 22 and the free flow of air from between the two surfaces impeded. By shortening the plate 110, the interference created by the side wall 22 is eliminated. Another way of eliminating the interference and lengthening plate 110, would be to perforate the side walls 22 at the point where the flow of air would engage the side walls thereby permitting undiminished flow between the surfaces.

While the invention has been described in connection with different embodiments thereof, it will be understood that it is capable of further modification, and this application is intended to cover any variations, uses or adaptations of the invention following, in general, the principles of the invention and including such departures from the present disclosure as come within the known or customary practice in the art to which the invention pertains, and as may be applied to the essential features hereinbefore set forth and as fall within the scope of the invention or the limits of the appended claims.

Having thus described our invention, what we claim is:

1. A device for loading articles into a container, said articles having at least a portion of their surface smooth and unbroken comprising a guideway for said container, a support, an orifice block mounted on said support, a fluid pressure supply line for connection with a fluid pressure source connected to said block, said block having a chamber connecting with said fluid pressure line and having a front plate having a smooth unbroken surface cooperating with and corresponding to the smooth unbroken surface of said article, said front plate having a bore therethrough forming on the smooth front surface of said plate an orifice, said front plate having its minimum width equal to at least five times the diameter of said orifice, said bore being in length at least 3 times the orifice diameter, a back pressure line connected to said block and projecting into said chamber and positioned in aspirating relation with said fluid pressure line, an article holder mounted on a support, a reciprocating carriage associated with said article holder, cylinder and piston means connected to said carriage, said back pressure line connected to said cylinder and piston means for reciprocating said carriage, container indexing means associated with said carriage, means associated with said device for feeding said articles individually into close proximity with said orifice, and means associated with said carriage for releasing said articles into said container subsequent to said feeding, whereby when an article is fed into close proximity with said orifice and said cooperating surfaces are in matching relationship, upon the application of fluid pressure from said supply line into said chamber and through said bore and said orifice against the cooperating surface of said article, the flow of fluid is directed laterally of said orifice creating a reduced pressure area between the matching surfaces of said plates and said article to thereby pickup and draw the article towards said plate whereupon said fluid flow through said orifice is restricted and a back pressure is built up in said chamber and in said back pressure line to cause said piston to operate within said cylinder in one direction to thereby operate said container indexing means, and said article releasing means permitting said article to be fed into said container, whereupon said orifice becomes unrestricted permitting an aspirating effect on said back pressure line to exhaust said line to cause said piston to operate in the other direction thereby to operate said article feeding means.

2. A device for loading articles into a container as in claim 1, and wherein said container is provided with notches and said container indexing means includes a pawl connected to said reciprocating carriage for engaging said notches ad seriatim.

3. A device for loading articles into a container as in claim 1, and wherein said feeding means includes a bell crank, a lifting finger connected to said bell crank said bell crank pivotally secured to said article holder and to said reciprocating carriage, whereby upon reciprocation of said carriage said lifting finger engages said article to place it in position before said orifice.

4. A device for loading articles into a container as in claim 1, and wherein said releasing means includes an article supporting member connected to said reciprocating carriage.

5. A device for loading articles into a container as in claim 1, and wherein said releasing means includes an article supporting member connected to said reciprocating carriage, and means for preventing damage to articles upon release.

6. A device for loading articles into a container as in claim 1 and having means associated with said carriage for automatically stopping said device upon delivery of said last article.

7. A device for loading articles into a container as in claim 1, and wherein said feeding means includes an article separator.

8. A device for loading articles into a container as in claim 1, and wherein said feeding means includes an article separator comprising an inclined plane and means cooperating therewith for fanning out said articles prior to pick up.

9. A device for loading articles into a container as in claim 1 and wherein said feeding means includes a stacked-article separator.

10. A device for loading articles into a container as in claim 1, and said front plate including a series of orifices.

11. A device for loading articles into a container as in claim 1 and said front plate including a series of orifices, individually opening into said chamber.

12. A device for loading articles in a container as in claim 1, and wherein said feeding means includes an article camming member for positioning said articles before said orifice.

13. A device for loading articles into a container as in claim 1, and having means associated with said carriage for automatically stopping said device upon delivery of said last article including a pivoted pawl member connected to said reciprocating carriage, a pin connected to said pivoted pawl member, and a keeper on said article holder, said pin engaging said keeper when said pawl is pivoted upon the filling of said container.

14. A device for loading articles into a container as in claim 1 and wherein said orifice is projected slightly from the face of said front plate.

15. A device for loading articles as in claim 1 and wherein said front plate is cut back on the sides to present shoulders on said orifice block to permit continuous flow of air laterally to permit smooth operation.

16. A pneumatic article handling device for articles having at least a portion of their surface smooth and unbroken comprising a fluid pressure supply line for connection to a fluid pressure supply source, a plate having a relatively smooth unbroken front surface cooperating with and corresponding to the smooth unbroken surface of said article, said plate having a bore therethrough forming on the smooth front surface of said plate, an orifice in said plate, said plate having its minimum width equal to at least five times the diameter of said orifice, said supply line being connected with the back of said plate and said bore, whereby when said article is in close proximity with said orifice and said cooperating surfaces are in matching relationship, upon the application of fluid pressure through said orifice against the cooperating surface of said article, the flow of fluid is directed laterally of said orifice creating a reduced pressure area between the matching surfaces of said plate and said article to thereby pick-up and draw said article towards said plate, and means for supporting the article in surface matching relationship and in close proximity to said plate.

17. A pneumatic article handling device as in claim 16, and having a back-pressure line connected with said fluid pressure supply line, said back pressure line connected with a fluid pressure operated article feeder.

18. A pneumatic article handling device for articles having at least a portion of their surface smooth and unbroken comprising a fluid pressure supply line for connection to a fluid pressure supply source, a plate having a relatively smooth unbroken front surface cooperating with and corresponding to the smooth unbroken surface of said article, said plate having a bore therethrough forming on the smooth front surface of said plate, an orifice in said plate, said plate having its minimum width equal to at least five times the diameter of said orifice, said supply line being connected with the back of said plate and said bore, whereby when said article is in close proximity with said orifice and said cooperating surfaces are in matching relationship, upon the application of fluid pressure through said orifice against the cooperating surface of said article, the flow of fluid is directed laterally of said orifice creating a reduced pressure area between the matching surfaces of said plate and said article to thereby pick-up and draw said article towards said plate, and a back-pressure line connected with said fluid pressure supply line, said back pressure line connected with a fluid pressure operated article sensing device.

19. A pneumatic article handling device for articles having at least a portion of their surface smooth and unbroken comprising a fluid pressure supply line for connection to a fluid pressure supply source, a plate having a relatively smooth unbroken front surface cooperating with and corresponding to the smooth unbroken surface of said article, said plate having a bore therethrough forming on the smooth front surface of said plate, an orifice in said plate, said plate having its minimum width equal to at least five times the diameter of said orifice, said supply line being connected with the back of said plate and said bore, whereby when said article is in close proximity with said orifice and said cooperating surfaces are in matching relationship, upon the application of fluid pressure through said orifice against the cooperating surface of said article, the flow of fluid is directed laterally of said orifice creating a reduced pressure area between the matching surfaces of said plate and said article to thereby pick-up and draw said article towards said plate, and a back pressure line connected with said fluid pressure supply line, said back pressure line connected with fluid pressure piston operated article feeding means.

20. A pneumatic article handling device for articles having at least a portion of their surface smooth and unbroken comprising a fluid pressure supply line for connection to a fluid pressure supply source, a plate having a relatively smooth unbroken front surface cooperating with and corresponding to the smooth unbroken surface of said article, said plate having a bore therethrough forming on the smooth front surface of said plate, an orifice in said plate, said plate having its minimum width equal to at least five times the diameter of said orifice, said supply line being connected with the back of said plate and said bore, whereby when said article is in close proximity with said orifice and said cooperating surfaces are in matching relationship, upon the application of fluid pressure through said orifice against the cooperating surface of said article, the flow of fluid is directed laterally of said orifice creating a reduced pressure area between the matching surfaces of said plate and said article to thereby pick-up and draw said article towards said plate, and a back pressure line connected with said fluid pressure supply line, said back pressure line connected with fluid pressure release means for releasing said article after it has been picked up.

21. A pneumatic article handling device for articles having at least a portion of their surface smooth and unbroken comprising a fluid pressure supply line for connection to a fluid pressure supply source, a plate having a relatively smooth unbroken front surface cooperating with and corresponding to the smooth unbroken surface of said article, said plate having a bore therethrough forming on the smooth front surface of said plate, an orifice in said plate, said plate having its minimum width equal to at least five times the diameter of said orifice, said supply line being connected with the back of said plate and said bore, whereby when said article is in close proximity with said orifice and said cooperating surfaces are in matching relationship, upon the application of fluid pressure through said orifice against the cooperating surface of said article, the flow of fluid is directed laterally of said orifice creating a reduced pressure area between the matching surfaces of said plate and said article to thereby pick-up and draw said article towards said plate, and a back pressure line connected with said fluid pressure supply line, said back pressure line connected with pressure operated means for feeding said articles for pick-up and releasing said articles after pick-up.

22. A pneumatic article handling device for articles having at least a portion of their surface smooth and unbroken comprising a fluid pressure supply line for connection to a fluid pressure supply source, a plate having a relatively smooth unbroken front surface cooperating with and corresponding to the smooth unbroken surface of said article, said plate having a bore therethrough forming on the smooth front surface of said plate, an orifice in said plate, said plate having its minimum width equal to at least five times the diameter of said orifice, said supply line being connected with the back of said plate and said bore, whereby when said article is in close proximity with said orifice and said cooperating surfaces are in matching relationship, upon the application of fluid pressure through said orifice against the cooperating surface of said article, the flow of fluid is directed laterally of said orifice creating a reduced pressure area between the matching surfaces of said plate and said article to thereby pick-up and draw said article towards said plate, and a back pressure line connected with said fluid pressure supply line, said back pressure line connected with fluid pressure means for automatically sensing, feeding, and releasing said articles.

23. A pneumatic article handling device for articles having at least a portion of their surface smooth and unbroken comprising a fluid pressure supply line for connection to a fluid pressure supply source, a plate having a relatively smooth unbroken front surface cooperating with and corresponding to the smooth unbroken surface of said article, said plate having a bore therethrough forming on the smooth front surface of said plate, an orifice in said plate, said plate having its minimum width equal to at least five times the diameter of said orifice, said supply line being connected with the back of said plate and said bore, whereby when said article is in close proximity with said orifice and said cooperating surfaces are in matching relationship, upon the application of fluid pressure through said orifice against the cooperating surfaces of said article, the flow of fluid is directed laterally of said orifice creating a reduced pressure area between the matching surfaces of said plate and said article to thereby pick-up and draw said article towards said plate, and a back pressure line connected with said fluid pressure supply line in aspirating relation, and cylinder and piston operated article feeding means connected with said back pressure line, said back pressure line operating to exhaust said cylinder prior to article pick-up, and pressurize said cylinder upon article pick-up.

24. A pneumatic article handling device for articles having at least a portion of their surface smooth and unbroken comprising a fluid pressure supply line for connection to a fluid pressure supply source, a plate having a relatively smooth unbroken front surface of said article, said plate having a bore therethrough forming on the smooth front surface of said plate, an orifice in said plate, said plate having its minimum width equal to at least five times the diameter of said orifice, said supply line being connected with the back of said plate and said bore, whereby when said article is in close proximity with said orifice and said cooperating surfaces are in matching relationship, upon the application of fluid pressure through said orifice against the cooperating surface of said article, the flow of fluid is directed laterally of said orifice creating a reduced pressure area between the matching surfaces of said plate and said article to thereby pick-up and draw said article towards said plate, and a back-pressure line connected with said fluid pressure supply line, said back-pressure line connected with fluid pressure operating means for indexing said articles for pick-up, releasing said articles after pick-up, and indexing said articles after release.

References Cited in the file of this patent

UNITED STATES PATENTS

| | | |
|---|---|---|
| 2,218,849 | Luhrman | Oct. 22, 1940 |
| 2,718,342 | Anderson | Sept. 20, 1955 |
| 2,942,392 | McCain et al. | June 28, 1960 |
| 2,953,371 | Smith | Sept. 20, 1960 |